(12) United States Patent
Maduskuie et al.

(10) Patent No.: US 8,164,225 B2
(45) Date of Patent: Apr. 24, 2012

(54) MULTIPLE PASS AXIAL COOLED GENERATOR

(75) Inventors: Andrew David Maduskuie, Latham, NY (US); Gary Randall Barnes, Delanson, NY (US); Thomas Mancuso, Niskayuna, NY (US); Peter Anthony DiLorenzo, Charlton, NY (US)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 12/464,971

(22) Filed: May 13, 2009

(65) Prior Publication Data

US 2010/0289349 A1  Nov. 18, 2010

(51) Int. Cl.
*H02K 1/20* (2006.01)
*H02K 9/00* (2006.01)

(52) U.S. Cl. ............. 310/59; 310/52; 310/58; 310/60 R

(58) Field of Classification Search .............. 310/59, 310/58, 52, 54, 55, 57, 60 R, 65, 64; H02K 9/00, H02K 1/20
See application file for complete search history.

(56) References Cited

U.S. PATENT DOCUMENTS

| | | | |
|---|---|---|---|
| 4,912,350 A * | 3/1990 | Parshall et al. | 310/216.014 |
| 5,084,642 A * | 1/1992 | Katsuzawa et al. | 310/54 |
| 5,763,969 A * | 6/1998 | Metheny et al. | 310/62 |
| 6,515,384 B1 * | 2/2003 | Kikuchi et al. | 310/58 |
| 6,680,550 B2 * | 1/2004 | Matsunaga et al. | 310/58 |
| 6,727,611 B2 * | 4/2004 | Bostwick | 310/58 |
| 2002/0005671 A1 | 1/2002 | Welke et al. | |
| 2004/0245883 A1 * | 12/2004 | Mitcham et al. | 310/58 |
| 2005/0067904 A1 * | 3/2005 | Houle et al. | 310/54 |

FOREIGN PATENT DOCUMENTS

| | | | |
|---|---|---|---|
| DE | 19757605 A1 * | 6/1999 | |
| JP | 60121941 A | 6/1985 | |
| JP | 2005143269 A | 6/2005 | |
| WO | 2008132041 A1 | 11/2008 | |
| WO | WO 2008132041 A1 * | 11/2008 | |

OTHER PUBLICATIONS

Machine translation of DE19757605A1.*
Machine translation of WO2008/132041A1.*
GB1007757.6, Search Report and Written Opinion, Aug. 27, 2010.

* cited by examiner

*Primary Examiner* — Quyen Leung
*Assistant Examiner* — Michael Andrews
(74) *Attorney, Agent, or Firm* — Cantor Colburn LLP

(57) ABSTRACT

A generator includes a housing and a stator arranged within the housing. The stator includes a first end that extends to a second end, and a plurality of axial flow passages extending between the first and second ends. The generator also includes at least one air flow re-direction member provided on at least one of the first and second ends of the stator. The at least one air flow re-direction member fluidly connects adjacent ones of the plurality of axial flow passages. The at least one air flow re-direction member guides an air flow passing though one of the plurality of axial flow passages in a first direction into an adjacent one of the plurality of axial flow passages in a second direction, the second direction being distinct from the first direction.

9 Claims, 5 Drawing Sheets

Figure 1:
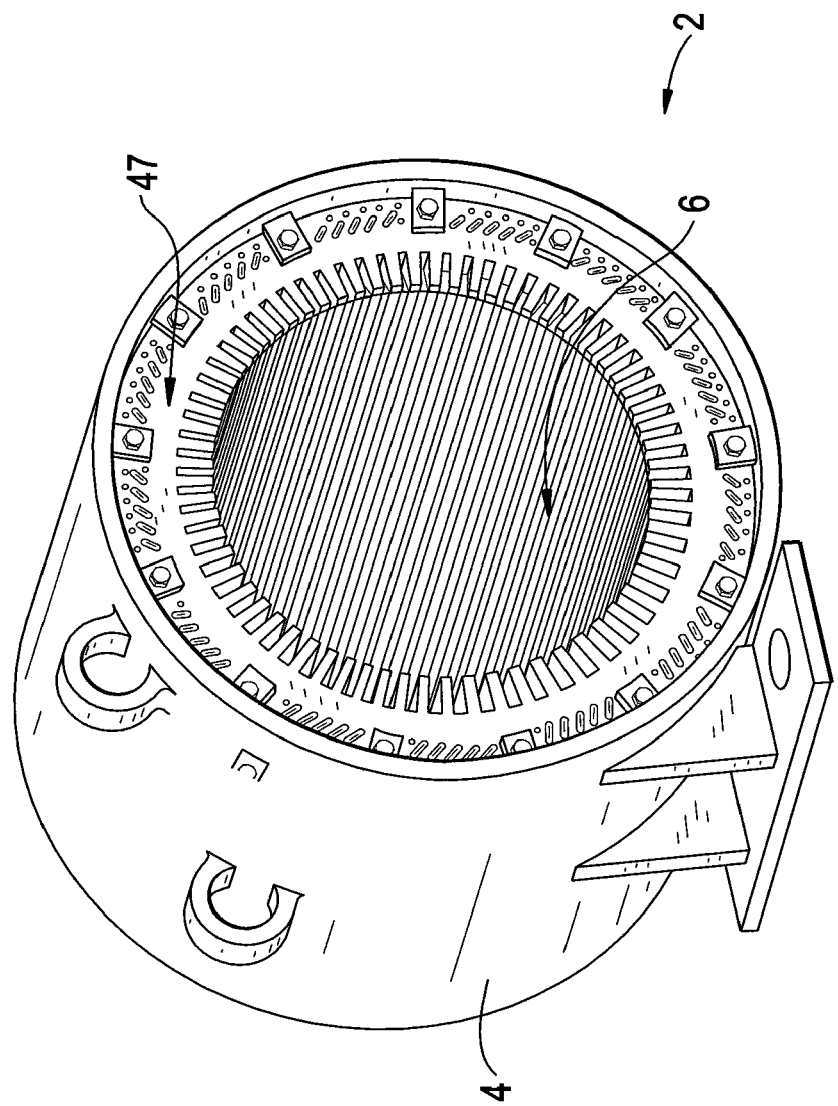
Figure 2:
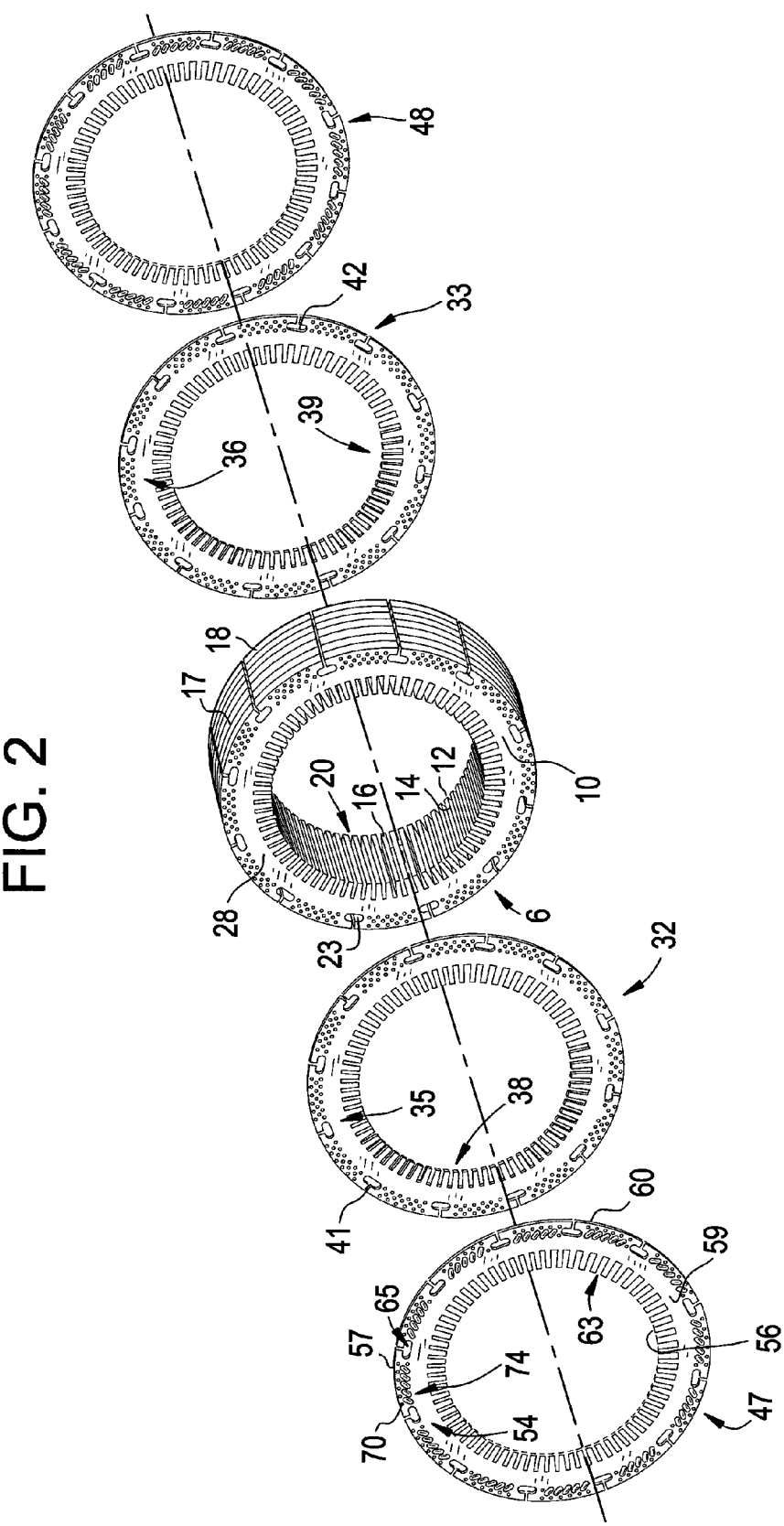
Figure 3:
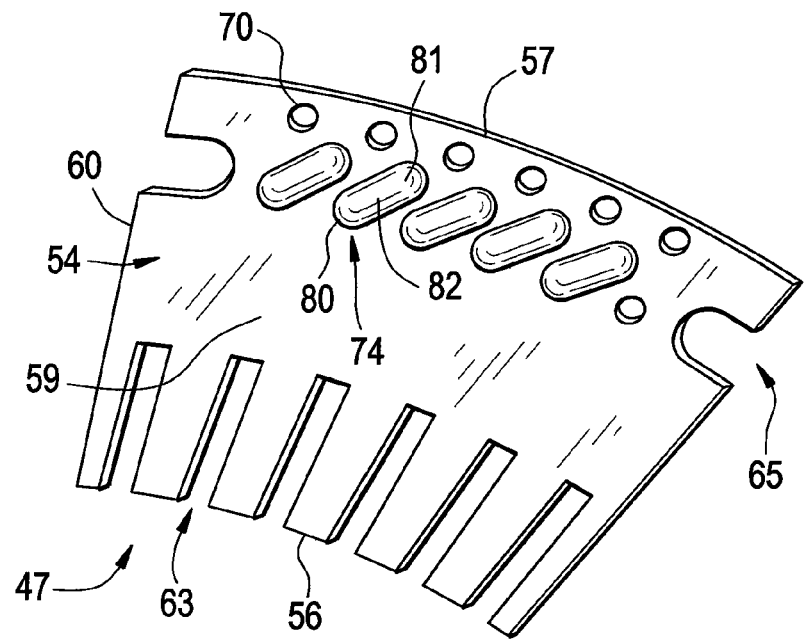
Figure 4:
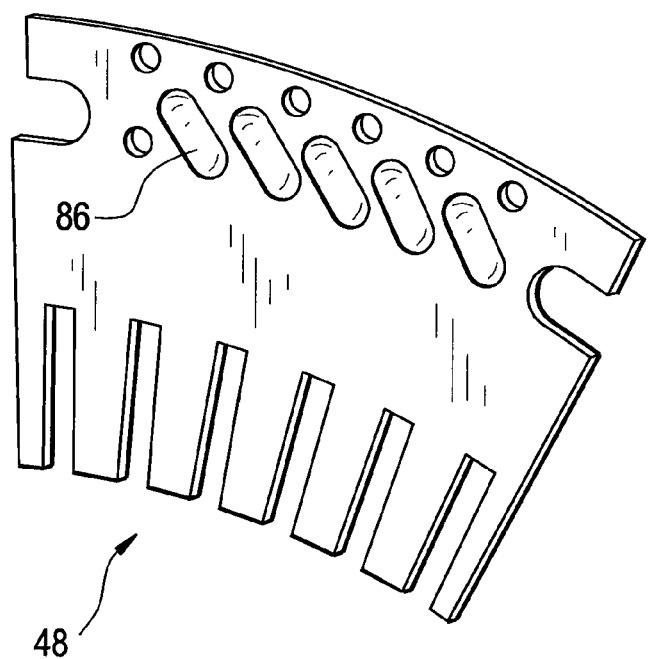

{"# MULTIPLE PASS AXIAL COOLED GENERATOR\n\n## BACKGROUND OF THE INVENTION\n\nThe subject matter disclosed herein relates to the art of generators and, more particularly, to a generator including a multiple pass axially cooled stator.\n\nSome conventional generators utilize a radial air flow to cool internal components. In particular, axial air flows are directed through a stator portion of the generator. The stator includes a plurality of passages that serve as a conduit for a cooling airflow. The cooling air flow is passed, in one direction, through the plurality of passages to conduct heat away from the stator. By lowering internal stator temperatures, generator efficiency is enhanced.\n\nSmaller generators, such as those employed in wind turbines, may also employ stators having axial flow passages. However, some generator designs employ a shorter stator length. As such, the cooling airflow is not utilized efficiently. More specifically, the shorter stator length and correspondingly shorter axial flow passage do not provide adequate time for sufficient heat transfer between the stator and the air flow. Accordingly, in shorter generators, exit temperature of the cooling air flow is much lower than the exit temperature of the cooling air flow in larger generators. As a consequence, heat carrying capacity of the cooling air flow is under utilized.\n\n## BRIEF DESCRIPTION OF THE INVENTION\n\nAccording to one aspect of the invention, a generator includes a housing and a stator arranged within the housing. The stator includes a first end that extends to a second end, and a plurality of axial flow passages extending between the first and second ends. The generator also includes at least one air flow re-direction member provided on at least one of the first and second ends of the stator. The at least one air flow re-direction member fluidly connects adjacent ones of the plurality of axial flow passages. The at least one air flow re-direction member guides an air flow passing through one of the plurality of axial flow passages in a first direction into an adjacent one of the plurality of axial flow passages in a second direction, the second direction being distinct from the first direction.\n\nAccording to another aspect of the invention, a method of cooling a generator stator includes guiding a cooling air flow into a first end of a first axial flow passage arranged within the generator stator, passing the cooling air flow along the axial flow passage in a first direction towards a second end, re-directing the cooling air flow from the second end of the axial flow passage toward a first end of an adjacent axial flow passage, and passing the cooling air flow along the adjacent axial flow passage in a second direction, the second direction being opposite the first direction to establish a multiple pass axial cooled stator.\n\nThese and other advantages and features will become more apparent from the following description taken in conjunction with the drawings.\n\n## BRIEF DESCRIPTION OF THE DRAWING\n\nThe subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:\n\nFIG. 1 is a lower left perspective view of a multiple pass axially cooled generator in accordance with an exemplary embodiment;\n\nFIG. 2 is an exploded view of a stator including air flow re-direction members in accordance with an exemplary embodiment;\n\nFIG. 3 is a partial front perspective view of an air flow re-direction member in accordance with an exemplary embodiment;\n\nFIG. 4 is a partial rear perspective view of an air flow re-direction member in accordance with an exemplary embodiment;\n\nFIG. 5 is a partial front perspective view of an air flow re-direction member constructed in accordance with another exemplary embodiment; and\n\nFIG. 6 is a partial perspective view of a stator including air flow re-direction members in accordance with another exemplary embodiment.\n\nThe detailed description explains embodiments of the invention, together with advantages and features, by way of example with reference to the drawings.\n\n## DETAILED DESCRIPTION OF THE INVENTION\n\nWith reference to FIGS. 1-4, a generator constructed in accordance with an exemplary embodiment is indicated generally at 2. Generator 2 includes a housing 4 that surrounds a stator 6 and a rotor (not shown). Stator 6 includes a first end 10 that extends to a second end 12 through an intermediate portion 14 that defines an inner diametric portion 16 and an outer diametric portion 17. As shown, stator 6 is formed from a plurality of stacked laminations, one of which is indicated at 18. Stator 6 includes a plurality of slots/grooves 20 formed on inner diametric portion 16 and a plurality of compression bolt slots 23 formed about outer diametric portion 17.\n\nAs best shown in FIG. 2, stator 6 includes a plurality of axial flow passages, indicated generally at 28, that extend between first and second ends 10 and 12. Axial flow passages 28 provide conduits for a cooling air flow that passes through stator 6. Stator 6 is also shown to include first and second finger/compression plates 32 and 33. First compression plate 32 abuts first end 10 while second compression plate 33 abuts second end 12. Each compression plate includes a plurality of openings 35 and 36 that register with axial flow passages 28, a plurality of grooves 38 and 39 that register with grooves 20 and a plurality of notches 41 and 42 that register with compression bolt slots 23. With this arrangement, first and second compression plates 32 and 33 serve to press the plurality of laminations 18 together to form one solid body for structural and vibrational purposes.\n\nIn accordance with the exemplary embodiment, stator 6 includes a first air flow re-direction member 47 and a second air flow re-direction member 48. In the exemplary embodiment shown, first air flow re-direction member 47 is mounted to and abuts first compression plate 32 while second air flow re-direction member 48 is mounted to and abuts second compression plate 33. Air flow re-direction members 47 and 48 are mounted to corresponding ones of compression places 32 and 33 through, for example, the use of a compression ring and or bolting blocks (not shown). As each air flow re-direction member 47, 48 is substantially identically formed, a detailed description will follow referencing first air flow re-direction member 47 with an understanding that second air flow re-direction member 48 is similarly constructed.\n\nAs best shown in FIG. 3 air flow re-direction member 47 includes a main body 54 having an inner diametric section 56 and an outer diametric section 57 that define a first surface 59"} and an opposing second surface 60. A plurality of grooves 63 radiate along inner diametric section 56 and a plurality of notches 65 are formed at outer diametric section 57. Grooves 63 are arranged to register with grooves 20 and 38, while notches 65 are arranged to register with notches 41 and compression bolt slots 23. In addition, air flow re-direction member 47 includes a plurality of openings indicated generally at 70 that register with select ones of the plurality of axial flow passages 28 to define inlets and outlets (not separately labeled) as will be detailed more fully below.

In further accordance with the exemplary embodiment, air flow re-direction member 47 includes a plurality of air flow re-direction components indicated generally at 74. Each air flow re-direction component includes a first end portion 80 that extends to a second end portion 81 through a guide portion 82. In addition, each air flow re-direction component includes an arcuate section 86 (FIG. 4) that is concave when viewed from second surface 60. With this arrangement, first end portion 80 is positioned to register with one of the plurality axial flow passages 28 while second end portion 81 is positioned to register with another one of the plurality of axial flow passages 28. In this manner, air entering one of the inlet openings (not separately labeled) flows through the one of the plurality of axial flow passages 28 impinges upon air flow re-direction component 74 and is redirected into the another of the plurality of axial flow passages 28 before exiting from one of the outlet openings (not separately labeled) such that the air flow passes multiple times through stator 6.

Figure 5:
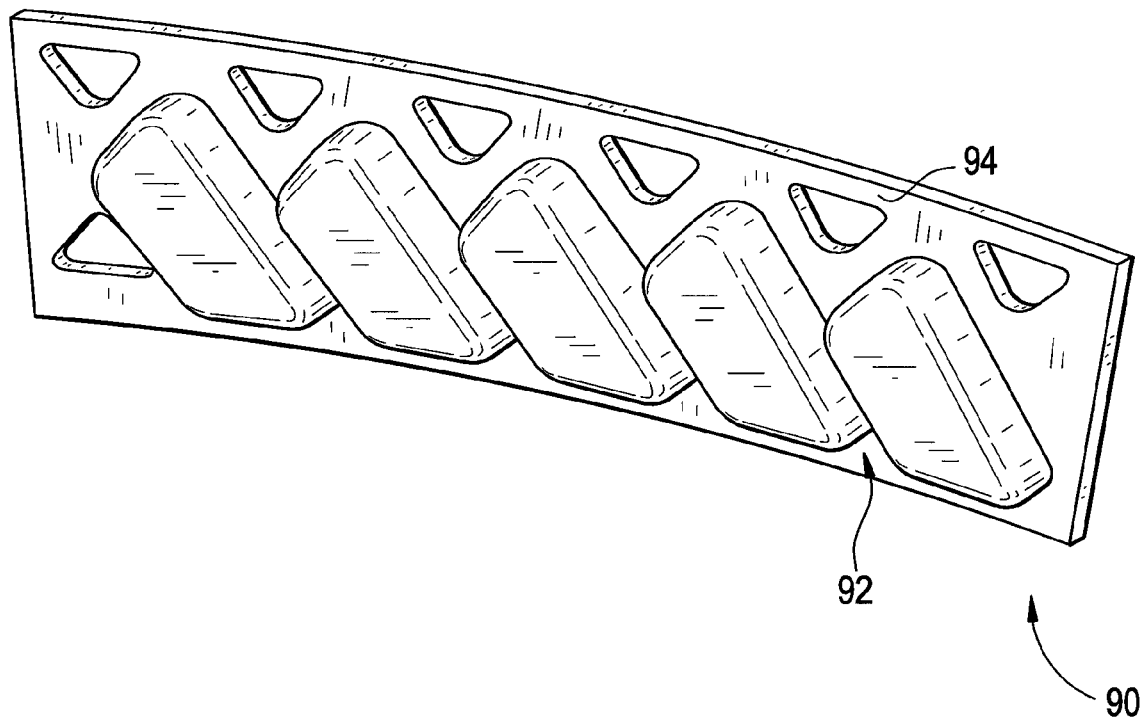
Figure 6:
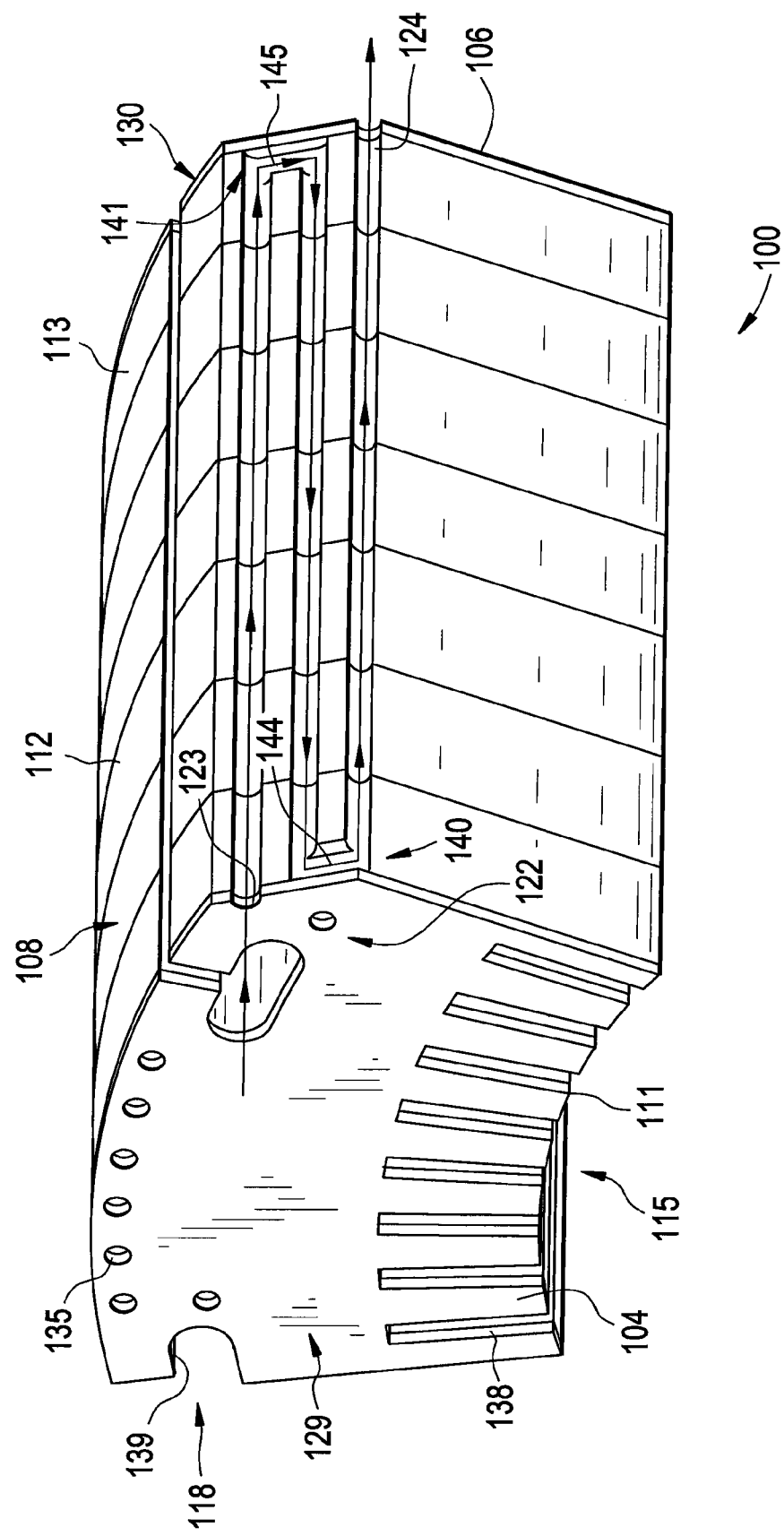

In accordance with one exemplary embodiment illustrated in FIG. 5, an air flow re-direction member 90 is molded from a thermoplastic polymer such as, for example, polyethylene, polypropylene, or a polyamide. Air flow re-direction member 90 may also be molded from a fiber-reinforced polymer, or fiber-reinforced organic compound. Air flow re-direction member 90 includes a plurality of air flow re-direction components 92 as well as a plurality of openings 94 that are configured to register with respective ones the plurality axial flow passages 28. Air flow re-direction member 90 is added to stator 6 after a resin application process.

In accordance with another aspect of the invention, air flow re-direction member 47 constitutes a compression plate. With this arrangement, air flow re-direction components 74 are stamped into the compression plate. In this manner, the stamped air flow re-direction members are employed as compression plates to press the plurality of laminations together to form the one solid body. As such, there is no need for additional compression plates and stator 6 can be formed using fewer components. In any event, the cooling air flow is passed multiple times through stator 6 to enhance heat absorption. That is, cooling air having substantial additional heat carrying capacity is not passed from stator 100. The multiple axial passes of cooling air flow is particularly advantageous in generators having a thin profile such as used in wind generators and marine/hydro-power applications, however multiple axial passes of cooling air flow can be utilized in a wide array of generator models for various applications.

Reference will now be made to FIG. 5 in describing a stator 100 constructed in accordance with another exemplary aspect of the invention. As shown, stator 100 includes a first end 104 that extends to a second end 106 through an intermediate portion 108 that define an inner diametric portion 111 and an outer diametric portion 112. As shown, stator 100 is formed from a plurality of stacked laminations, one of which is indicated at 113. Stator 100 includes a plurality of slots/grooves 115 formed on inner diametric portion 111 and a plurality of compression bolt slots 118 formed about outer diametric portion 112.

In addition, stator 100 includes a plurality of axial flow passages, indicated generally at 122, that extend between first and second ends 104 and 106. Select ones of axial flow passages 122 include an inlet, such as indicated at 123 while other select ones of the axial flow passages 122 include an outlet such as indicated at 124. As will be detailed more fully below, axial flow passages 122 provide conduits for a cooling air flow that passes through stator 100. Stator 100 is also shown to include first and second finger/compression plates 129 and 130. First compression plate 129 abuts first end 104 while second compression plate 130 abuts second end 106. Compression plate 129 includes a plurality of openings one of which is indicated at 135 that register with axial flow passages 122, a plurality of grooves, such as indicated at 138, that register with grooves 115 and a plurality of notches 139 that register with compression bolt slots 118. Of course it should be understood that compression place 130 includes similar structure. In a manner similar to that described above, first and second compression plates 129 and 130 serve to press the plurality of laminations 113 together forming one solid body for structural and vibrational purposes.

In further accordance with the exemplary embodiment shown, stator 100 includes a first air flow re-direction member 140 and a second air flow re-direction member 141. First air flow re-direction member 140 is defined by a first channel 144 formed at first end 104 while second air flow re-direction member 141 is defined by a second channel 145 formed at second end 106. More specifically, channel 144 is formed within laminations 118 and connects adjacent ones of the plurality of axial flow passages while channel 145 is formed within laminations 118 at second end 106 and connects with one of the plurality of axial flow passages 122 connected to channel 144 and another of the plurality of axial flow passages. Of course it should be understood that while only two channels are shown and described, stator 100 includes a plurality of channels that extend about the outer diametric portion 112.

With this arrangement, the cooling air flow passes in a back and forth pattern throughout stator 100. That is, the cooling air enters inlet 123 passes along one of the plurality of axial flow passages 122 to channel 145, transitions to another of the plurality of axial flow passages 122 before flowing through channel 144 to transition to yet another of the plurality of axial flow passages 122 and exiting from outlet 124. In this manner, the cooling air flow is passed multiple times through stator 100 to enhance heat absorption. That is, cooling air having substantial additional heat carrying capacity is not passed from stator 100. The multiple axial passes of cooling air flow is particularly advantageous in generators having a thin profile such as used in wind generators and marine/hydro-power applications, however multiple axial passes of cooling air flow can be utilized in a wide array of generator models for various applications.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A generator comprising:
   a housing;
   a stator arranged within the housing, the stator including a first end that extends to a second end, a plurality of laminations extending between the first and second ends, and a plurality of axial flow passages extending through the plurality of laminations between the first and second ends, the stator including a compression plate mounted to one of the first and second ends; and
   at least one air flow re-direction member including at least one channel at least partially defined by the one of the plurality of laminations adjacent to the compression plate, the at least one airflow redirection member fluidly connecting adjacent ones of the plurality of axial flow passages, the at least one air flow re-direction member guiding an air flow passing through one of the plurality of axial flow passages in a first direction into an adjacent one of the plurality of axial flow passages in a second direction, the second direction being distinct from the first direction.

2. The generator according to claim 1, wherein the at least one air flow re-direction member includes at least one air flow re-direction component.

3. The generator according to claim 2, wherein the at least one air flow re-direction component includes a first end portion that directs air to a second end portion, the first end portion being positioned at one of the plurality of axial flow passages and the second end portion being positioned at another of the plurality of axial flow passages.

4. The generator according to claim 2, wherein the at least one air flow re-direction member includes at least two openings, wherein one of the at least two openings registers with one of the plurality of axial flow passages and defines an inlet and the other of the at least two opening registers with another of the plurality of axial passages and defines an outlet.

5. The generator according to claim 1, wherein the at least one air flow re-direction member includes a plurality of air flow re-direction components, the plurality of air flow re-direction components being stamped into the compression plate.

6. The generator according to claim 1, wherein the at least one air flow re-direction member includes a first air flow redirection member mounted to the first end of the stator and a second air flow re-direction member mounted to the second end of the stator.

7. The generator according to claim 1, wherein the at least one channel includes a first channel formed in the plurality of laminations at the first end of the stator and a second channel formed in the plurality of laminations at the second end of the stator.

8. The generator according to claim 7, wherein the first channel connects a first one of the plurality of axial flow passages and a second one of the plurality of axial flow passages, and the second channel connects the second one of the plurality of axial flow passages with a third one of the plurality of axial flow passages.

9. The generator according to claim 1, wherein the at least one channel comprises a slot formed in the one of the plurality of laminations.

* * * * *